Patented June 11, 1946

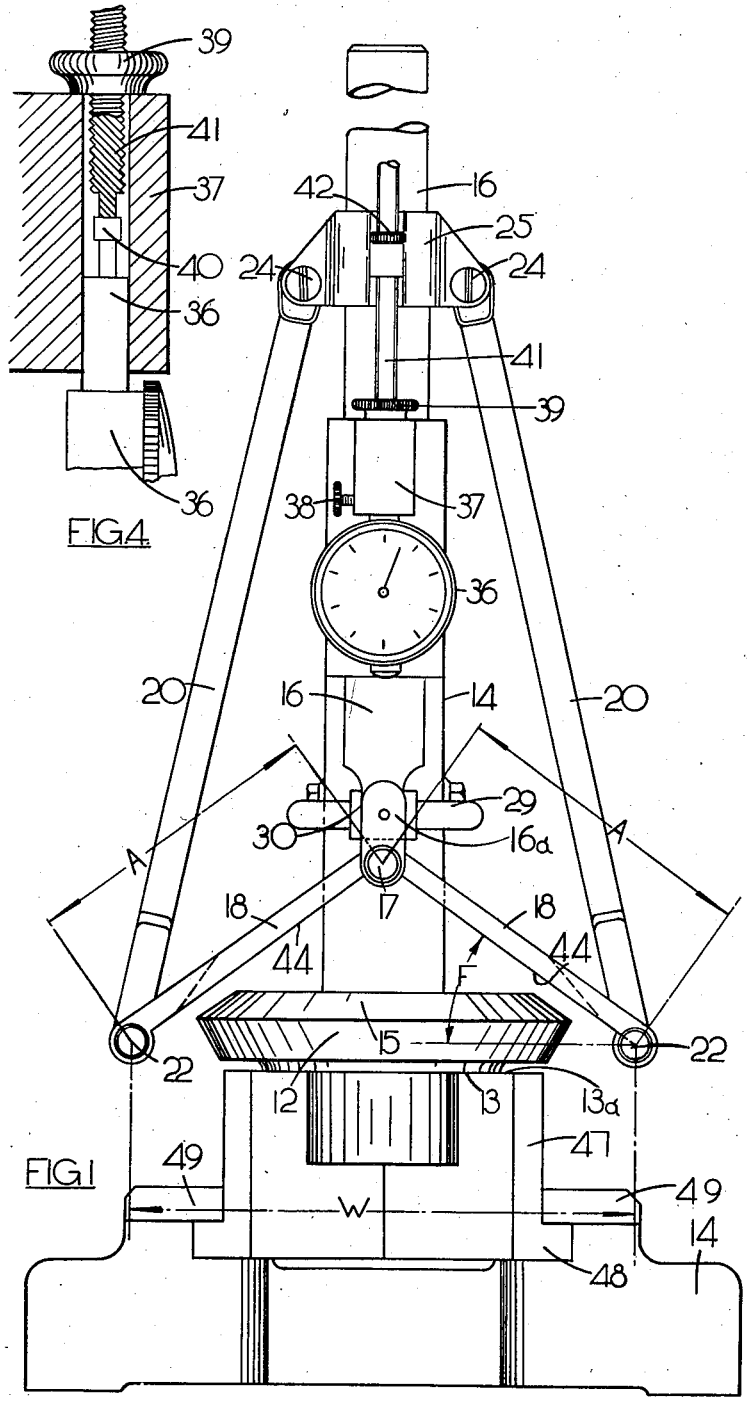

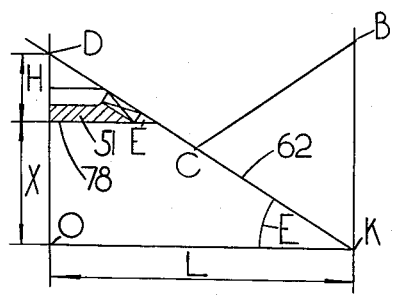
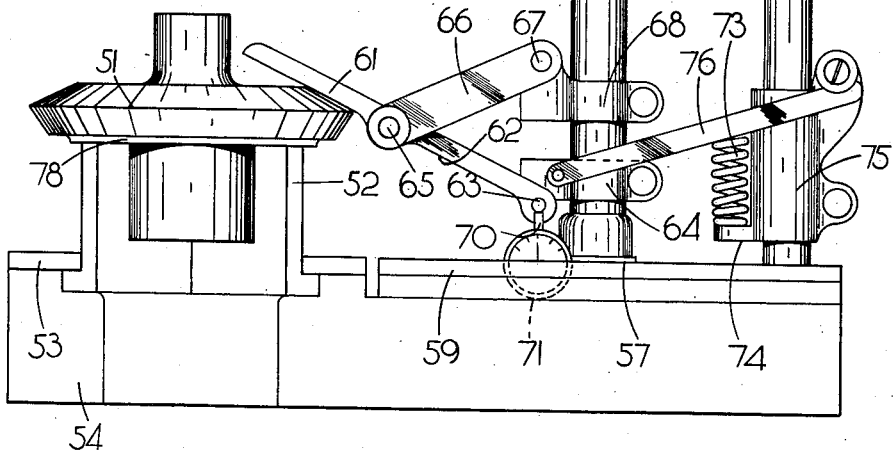
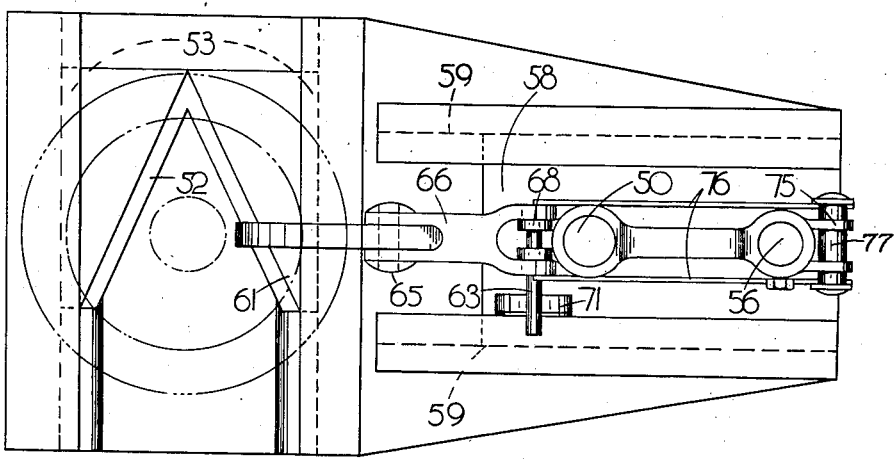

2,402,015

UNITED STATES PATENT OFFICE 2,402,015

GAUGING APPARATUS FOR USE WITH FRUSTOCONICAL OR LIKE ARTICLE

Angus Henry Farquhar Bowness, Leamington Spa, England

Application September 22, 1944, Serial No. 555,328
In Great Britain February 18, 1944

6 Claims. (Cl. 33—174)

My main object is to provide an adjustable gauging device for measuring an angle-characteristic (for example, the distance of the apex point from a datum line) of a frusto-conical or like article.

The gauging device of the invention includes a member, slidable relatively to the article to be gauged, to which is pivoted a gauging arm (the gauging surface thereof being coplanar with the pivotal axis) which can be adjustably set relatively to the axis of the article at an angle dependent upon the correct angle of the article, and indicating means adapted to respond to the position of the pivotal axis, so that the apex point can be determined when the gauging surface of the arm is contacting the appropriate surface of the article.

In the accompanying drawings:

Figure 1 is a front elevation of a gauging device, according to the invention, for use in gauging a bevel wheel, with a bevel wheel, shown as a blank, in position;

Figure 2 a side elevation thereof with the bevel wheel removed;

Figures 3 and 4 are fragmentary views, to larger scales, of certain parts of the device of Figures 1 and 2;

Figure 5 is a diagrammatic side elevation of a modified form of the device, Figure 6 being a plan thereof; and Figure 7 is a diagram applicable to the construction of Figures 5 and 6.

Figure 3:
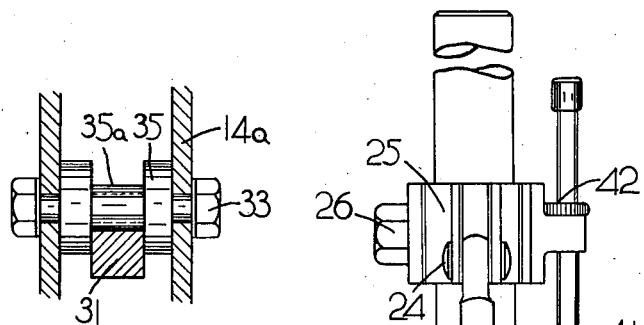
Figure 2:
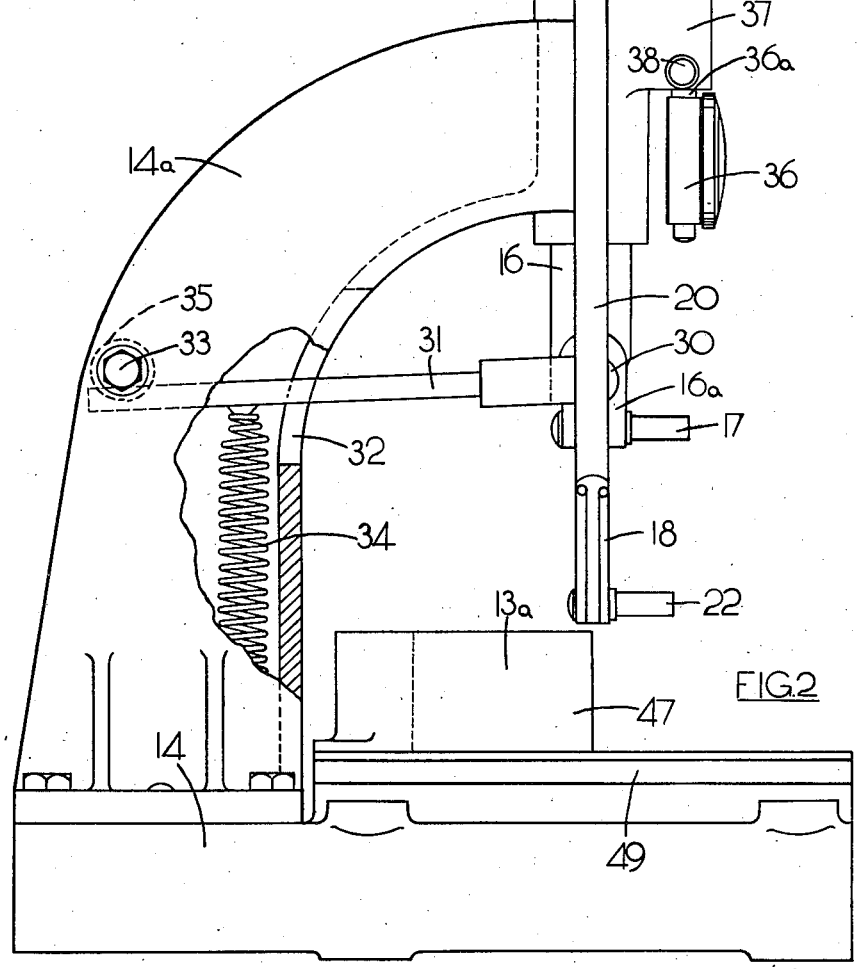

In the construction shown by Figures 1 to 4, for gauging the distance of the apex point of a bevel wheel 12 from the thrust face 13 thereof, the apparatus includes a stationary base 14 upon which the bevel wheel can be supported, with its axis vertical and its operative bevel face 15 (hereinafter referred to as the "face angle") uppermost. The base has bolted to it a hollow arm 14a which slidably supports, over the bevel wheel, a vertical pillar 16. This carries at its lower end an extending transverse pin 17 to which are hinged a pair of oppositely-extending, coplanar, gauging arms 18 to be held at an angle with one another corresponding to that of the "face angle" of the bevel wheel. A convenient way of adjustably supporting these arms includes the use of links 20 connected to the free ends of the arms by extending pins 22, parallel to the pin 17, and hinged at 24 at their upper ends to a collar 25 adjustably carried by the vertical pillar 16. The collar can be released for adjustment by the socket bolt 26 (Figure 2).

In the present construction the reduced lower end 16a of the vertical pillar 16 is hinged by a pin 29 (which is also a convenient operating handle) to the forked end 30 of an arm 31 which extends through a slot 32 in the stationary arm 14a to engage beneath an abutment pin 33 carried by the arm 14a, and a compression spring 34 is mounted in the interior of the arm 14a to engage beneath the arm 31, the spring being adapted just to take the weight of the vertical pillar and associated parts. As shown most clearly by Figure 3, the free end of the arm 31 engages the cheeks 35 of a guide roller 35a carried within the hollow of the arm 14a by the abutment pin 33, and this prevents the vertical pillar 16 from rotating.

The drawings show an inverted dial gauge 36 the body 36a of which extends through a tubular portion 37 of the arm 14a, being clamped therein by a screw 38. Coacting with the movable element 40 of the gauge is a screw-threaded rod 41 (see Figure 4) engaged with the collar 25 and locked thereto by a lock nut 42. A stop nut 39 on the rod 41 prevents the latter from engaging the movable gauge element 40 in a manner which might damage the gauge.

It is convenient that the arms 18 should be shaped so that their gauging surfaces 44 should lie, respectively, in the planes of the pivotal axes 17, 22 of the arms. The pivot pins 22 are, in the first instance, positioned apart from one another by measurement, while the collar 25 is free, a distance W which can be calculated from the angle F of the "face angle" and the effective lengths A of the arms, so that the arms will be at the required angle from one another. Thus, W=2A cos F. Thereupon, the collar should be fixed with respect to the pillar. Then, with the use of a master bevel wheel the pillar is moved downwardly, against the pressure of the spring 34, till the arms 18 engage the "face angle," and the gauge indicator then adjusted to a zero reading in a manner which will be well understood. A component to be gauged can then be substituted for the master, and comparison is obtained when the pillar is moved for the arms 18 to engage the "face angle" of the component. More usually, however, in the absence of a master bevel wheel, use is made of slip gauges or a specially made block, for the height of the apex point from the thrust face is normally given on the drawings of a bevel wheel. This height is equal to the height of the slip gauges to be used plus half the diameter of the pin 17, assuming that the slip gauges are measuring between the thrust face (i. e., the face 13a on the supporting block 47) and the periphery of the pin 17.

The support 47 is V-shaped in plan, such that the bevel wheel will always be central, with respect to the pillar, when fully inserted therein. The drawings show the support as a slide the flanges 48 of which are held to the base by strips 49, provision being made for clamping the support at any desired point.

Obviously, in practice, only one of the gauging arms need be provided. With a pair of such arms as shown, only one could be operatively used when gauging a bevel wheel having an odd number of teeth.

Some bevel wheels are formed with a hub portion extending centrally from the "face angle," and to gauge such a wheel a different form of gauging apparatus is required, as otherwise the pin 17 might foul the hub before the gauging arms 18 could contact the "face angle." A satisfactory form is shown diagrammatically in Figures 5 and 6, in which 50 is a vertically-movable pillar, i. e., a pillar movable in a direction parallel to the axis of the bevel wheel 51—the latter being supported from a V-block 52 which is in turn transversely adjustable along the guides 53 in the stationary base 54. The upper end of the pillar 50 is slidably supported in a hollow boss 55 fast on a stationary column 56. The lower end of the pillar 50 is shown as slidably supported in a boss 57 fast with a base 58 upon which the stationary column 56 is supported, the base 58 being slidable within the guides 59 towards and away from the article to be gauged. A single arm 61 is used, this having a gauging surface 62 which is coplanar with the axis of a pin 63 upon which it is pivotally mounted and which is carried by a collar 64 adjustably clamped upon the pillar 50. Intermediate its ends the gauging arm 61 is hinged at 65 (the axis of the pin 65 being coplanar with the gauging surface 62) to a link 66 pivoted at 67 upon a collar 68 which is also adjustably mounted upon the column 56. The axis of the pivot 65 lies in the plane of the gauging surface 62, and the distances between the axes 63 and 65 and between the axes 65 and 67 are equal. The pin 63 extends laterally to coact with the movable element 70 of an inverted dial gauge 71 which is fast with the movable base 58.

In the present instance the weight of the movable column 50 is taken by a coil compression spring 73 acting between an abutment 74, on a collar 75 which is adjustably mounted upon the stationary column 56, and a link 76 pivotally joined to the collar 64 and bearing on the underside of a roller 77 as in the previous design.

The method of operation will best be followed by reference to the diagram of Figure 7, in which K represents the pivotal axis of the pin 63, B the pivotal axis of the pin 67, C the pivotal axis of the pin 65, D the apex point of the bevel gear 51, and the line KCD the gauging surface 62 which is inclined to the horizontal at an angle E. H is the distance of the apex point from the datum surface 78 of the bevel wheel, X the height of the datum surface above the point K, and L the distance of the point K from the centre line of the bevel wheel. KC equals CB by construction.

First of all, the contained angle BCK is set equal to twice the angle E, by adjustment of the collar 68 along the pillar 50 till the points K, B are at the requisite distance apart. The slidable base 58 carrying the gauging arm assembly is moved so that a convenient portion of the gauging surface 62 will contact the face angle of a bevel to be gauged, and the base is then locked in position. The distance L is then measured. From the triangle DOK of Figure 7 it will be observed that $X = L \tan E - H$. So the pillar 50 is then moved vertically till the point K is the requisite distance X from the datum surface 78 (without, of course, any bevel wheel being on the V-block). The gauge indicator is then set to give a convenient basic reading.

Having set up in this way a bevel gear to be gauged is inserted in the V-block and the pillar 50 lowered till the gauging arm contacts it, when the deviation from the correct apex height can be read from the gauge.

It will be understood that a bevel gear or the like can be gauged in other ways than that specifically described above in connection with Figures 5 to 7.

What I claim as my invention and desire to secure by Letters Patent of the United States is:

1. A gauging device, for measuring an angle-characteristic of a frusto-conical article, including a support for the article, a slidable member, a gauging arm pivoted upon said member, said gauging arm arranged so that its gauging surface is coplanar with the pivotal axis, a clamp axially adjustable along said member, a link interconnecting said gauging arm and clamp whereby said gauging arm can be set at a predetermined angle relatively to the axis of the article by adjustment of said clamp, and indicating means adapted to register the axial position of said member when said gauging surface operatively engages the article.

2. A gauging device, according to claim 1, including also means acting to take the weight of said member and associated parts, said member being vertically slidable.

3. A gauging device, for measuring an angle-characteristic of a frusto-conical article, including a stationary support for locating the article with its axis vertical, a vertical pillar, a stationary support guiding said pillar for axial movement, a horizontal pin extending from said pillar, a gauging arm pivoted upon said pin and shaped so that its gauging surface is coplanar with the axis of said pin, said parts positioned so that the centre line of said gauging arm passes through the axis of the article, adjustable means carried by said pillar for holding said gauging arm relatively to the horizontal in a position dependent upon the correct angle of the article, and an indicator adapted to register the axial position of said pillar.

4. A gauging device of the kind specified comprising a stationary base, a V-block adjustably mounted thereon to support an article to be gauged with its axis vertical, a member supported from said base for vertical sliding, a gauging arm, said arm pivoted upon a horizontal pin carried by said member, said pin extending laterally of said arm for use in setting up, a collar adjustably clamped to said member for vertical movement with respect thereto, a link interconnecting said arm and collar, spring means for taking the weight of said member and associated parts, and a dial-type gauge adapted to register the axial position of said pillar when said arm operatively engages the article.

5. A gauging device, according to claim 4, in which the pivot between said arm and link extends laterally of said arm for use in setting up.

6. A gauging device of the kind specified comprising a stationary base, adjustable means for supporting thereon an article to be gauged, a member supported from said base for movement parallel to the axis of the article, a gauging arm pivoted upon said member for movement about an axis at right angles to the direction of movement of said member, a collar adjustably clamped to said member, a link interconnecting said arm and said collar whereby said arm can be positioned at a required angle to the direction of movement of said member, counter-balance means for said member and associated parts, an indicating means carried by said base, said indicating means having a movable element, and means carried by said member co-operating with said movable element.

ANGUS HENRY FARQUHAR BOWNESS.